United States Patent [19]
Hsu

[11] Patent Number: 5,707,418
[45] Date of Patent: Jan. 13, 1998

[54] INORGANIC PHOSPHOROUS FERTILIZER

[75] Inventor: Hsinhung John Hsu, Ventura, Calif.

[73] Assignee: Safergro Laboratories, Inc., Ventura, Calif.

[21] Appl. No.: 788,860

[22] Filed: Jan. 23, 1997

[51] Int. Cl.$^6$ ........................................ C05B 9/00
[52] U.S. Cl. .................. 71/32; 71/33; 71/34; 71/DIG. 2
[58] Field of Search ........................... 71/32–34, DIG. 2; 423/299, 304, 321.1

[56] References Cited

U.S. PATENT DOCUMENTS

| | | | |
|---|---|---|---|
| 4,075,324 | 2/1978 | Thizy et al. | 424/128 |
| 5,514,200 | 5/1996 | Lovatt | 71/11 |

*Primary Examiner*—Ferris Lander
*Attorney, Agent, or Firm*—Gene W. Arant; Ralph D. Chabot; Michael J. Ram

[57] ABSTRACT

Concentrated phosphorus fertilizers of the phosphorous variety are described which are absorbed quickly into plant systems and improve plant growth. When diluted with water, there is formed a substantially fully soluble fertilizer having a foilage-acceptable pH.

7 Claims, No Drawings

INORGANIC PHOSPHOROUS FERTILIZER

BACKGROUND

This invention relates to a method of preparing a phosphorus fertilizer in a form which will absorb quickly into plant systems and thereafter be oxidized into a form more readily useable by a plant system.

Fertilizers have long been used to supply needed nutrition to plants. The principle components of plant fertilizers have centered on three elements: nitrogen, phosphorus and potassium.

Phosphorus is not found in nature in its elemental form. The principal source of phosphorus for the fertilizer industry, however, is obtained from the ores of phosphorus containing minerals. The usual practice in the fertilizer industry is to convert phosphorus ores into a phosphorus product containing the phosphoric radical ($PO_4^{-3}$) which can be absorbed, although rather inefficiently, into plants and thereafter used as nutrition. It is well known in the prior art that phosphorus is biologically active and nutritionally useful to plants only in the phosphoric form ($PO_4^{-3}$). A common source of the phosphoric radical ($PO_4^{-3}$) for fertilizers is phosphoric acid.

Many of the phosphorus fertilizers currently used have a number of undesired qualities. First, if not used rather quickly, they tend to form precipitates if prepared in concentrated solutions. Further, they must be maintained within a narrow pH range to prevent precipitation, which results in fertilizers with limited application. Only soluble materials can be utilized by plants.

Still another problem with phosphorus containing fertilizers, particularly phosphoric fertilizers, is that they are not readily absorbed by foliage and must be applied to the soil and thereafter absorbed by the plant root system. Since only a small portion of the phosphoric fertilizer applied to the soil is actually absorbed by a root system, frequent reapplication usually occurs. This is undesirable because it can lead to leaching of phosphate into the groundwater which may cause eutrophication of lakes, ponds and streams.

Prior art formulas of phosphorus fertilizers have identified these problems. U.S. Pat. No. 5,514,200, issued to Lovatt, describes a formula utilizing the more readily absorbed phosphorous form ($PO_3^{-3}$) in a composition buffered with an organic acid. However, as is discussed below, the present invention represents an improved and more effective composition for providing phosphorus to plants.

SUMMARY

The present invention is directed to a process for preparing a stable and highly concentrated phosphorus fertilizer which is stable when stored for long periods of time and, when subsequently diluted and thereafter applied to plants and/or soil, can be easily absorbed through the foliage or the root system of a plant. The absorbed phosphorus is then used by plants to perform or accelerate biological functions. Further, the present invention is directed to phosphorous acid or its salts dissolved in water and stabilized with an inorganic complexing agent such as polyphosphoric acid to prevent phosphorus or calcium phosphate precipitation. Although the present invention can function properly and remain dissolved in solution in the range of pH between 0.5 and 10.0, it is preferably maintained in a pH range between 5.0 and 7.5 for ideal absorption into plants.

DESCRIPTION

To prepare the more readily assimilated phosphorus, phosphorous acid or its salts are dissolved in water. The solution is then stabilized by adding polyphosphoric acid (superphosphoric acid) or its salts, added in intervals, until the polyphosphoric acid constitutes 1–30% by weight of the solution. Addition of the polyphosphoric acid or its salts prevents the precipitation of by-products such as calcium phosphate and increases the uptake of phosphorus by plants. The novel composition can be delivered to plants by foliar or soil applications such as through an irrigation system. The phosphorus fertilizers so prepared are taken up by plants in the phosphorous form and are gradually converted by enzymes in the plants to phosphoric form to perform or accelerate biological functions in the plant.

Phosphoric acid exists in the meta ($HPO_3$)$_n$, pyro ($H_4P_2O_7$) and ortho ($H_3PO_4$) form. Polyphosphoric acid or its salts function as complexing agents for minerals in water and prevent precipitation of phosphorus from phosphorous acid. Salts of polyphosphoric acid include but are not limited to potassium polyphosphate, ammonium polyphosphate, sodium polyphosphate, zinc polyphosphate, magnesium polyphosphate and iron polyphosphate. Polyphosphoric acid is a genus which includes the following species: polyphosphoric acid, dipolyphosphoric acid, tripolyphosphoric acid, tetra polyphosphoric acid, penta polyphosphoric acid, hexapolyphosphoric acid or the combinations.

The desired pH range is between 5.0 and 7.5. However, the pH can be from 0.5 to 10.0.

In order to more clearly define the invention, the following examples of methods of preparation are set forth. These examples are illustrative only and are not limiting as to the scope of the invention. Examples I and VII are typical fertilizer found in the prior art. Examples II and VIII embody the present invention with regards to phosphorous acid and an inorganic buffering agent. Examples III and IX are also prior art formulations embodying formulations of the Lovatt U.S. Pat. No. 5,514,200 which utilize phosphorous acid buffered with an organic acid. Examples IV, V and VI set forth alternative compositions of matter embodying the concept of the present invention.

EXAMPLE I (PRIOR ART)

A 0–28–25 fertilizer was prepared by mixing the following:

(1) 376 grams water
(2) 299 grams potassium hydroxide
(3) 325 grams phosphorous acid The fertilizer had a pH of approximately 6.2 with a resulting appearance that was cloudy. The solution was analyzed to contain 25.9% $P_2O_5$ and 25.2% $K_2O$.

EXAMPLE II

A 0–28–25 fertilizer was prepared by mixing the following:

(1) 366 grams water
(2) 299 grams potassium hydroxide
(3) 315 grams phosphorous acid
(4) 10 grams polyphosphoric acid The fertilizer had a pH of approximately 6.2 with a resulting appearance that was clear and was analyzed to contain 28.1% $P_2O_5$ and 24.9% $K_2O$.

EXAMPLE III (U.S. PAT. NO. 5,514,200)

A 0–28–25 fertilizer was prepared by mixing the following:

(1) 356 grams water
(2) 299 grams potassium hydroxide (3) 325 grams phosphorous acid (4) 20 grams citric acid The resulting appearance was clear with some precipitation. The solution was analyzed to contain 26.2% $P_2O_5$ and 24.7% $K_2O$.

In comparing Examples I, II, and III, the results indicate that the composition embodying the invention, Example II, results in over 10% additional $P_2O_5$ in solution than either the prior art or the recent patented formulation according to Lovatt.

EXAMPLE IV

A 4-25-15 fertilizer was prepared by mixing the following:

(1) 438 grams water (2) 180 grams potassium hydroxide (3) 285 grams phosphorous acid (4) 87 grams urea (5) After all the materials were dissolved, 10 grams of ammonium polyphosphate was added.

The resulting fertilizer had a pH of 5.9 and analyzed to obtain 4.1%N, 25.2% $P_2O_5$ and 14.9% $K_2O$.

EXAMPLE V

A 0-40-0 fertilizer was prepared by mixing the following:

(1) 534 grams water (2) 463 grams phosphorous acid (3) 3 grams sodium tripolyphosphate The fertilizer had a pH of 0.5 and was clear in appearance. This fertilizer can be further diluted with water at ratios of concentrate to water up to 1:10,000 and used as soil application or with irrigation water.

EXAMPLE VI

A 0-27-25 fertilizer was prepared by mixing the following:

(1) 308 grams water (2) 307 grams phosphorous acid (3) 365 potassium carbonate (4) 20 grams potassium polyphosphate The pH was approximately 6.2 and the fertilizer was observed to remain in solution for 30 days without formation of precipitate.

EXAMPLE VII (PRIOR ART)

A 4-25-15 fertilizer was prepared by mixing the following:

(1) 448 grams water (2) 180 grams potassium hydroxide (3) 285 grams phosphorous acid (4) 87 grams urea The fertilizer had a pH of approximately 5.8 and was analyzed to contain 4.1% N, 24.8% $P_2O_5$ and 15.3% $K_2O$.

EXAMPLE VIII

A 4-25-15 fertilizer was prepared by mixing the following:

(1) 448 grams water (2) 180 grams potassium hydroxide (3) 275 grams phosphorous acid (4) 87 grams urea (5) 10 grams polyphosphoric acid The fertilizer had a pH of approximately 5.9 and was analyzed to contain 4.1% N, 25.2% $P_2O_5$ and 15.1% $K_2O$.

EXAMPLE IX (U.S. PAT. NO. 5,514,200)

A 4-25-15 fertilizer was prepared by mixing the following:

(1) 428 grams water (2) 180 grams potassium hydroxide (3) 285 grams phosphorous acid (4) 87 grams urea (5) 20 grams citric acid The fertilizer had a pH of approximately 5.1 and was analyzed to contain 4.1% N, 24.6% $P_2O_5$ and 15.0% $K_2O$.

EXPERIMENTS

Experiment 1

The 3 fertilizer samples prepared as Examples I, II, and III were diluted with water at a ratio of concentrate to water of 1:250. The solutions were then sprayed on tomato plants at 5 mililiters per each plant. Four different plants were sprayed with each solution. One week after the application of the solution, the twelve plants were cut at soil level, washed with dilute acid and water and then dried in an oven at 75° C. for 24 hours. The dried plants were then analyzed for total phosphorus and potassium. The analysis results are as follows:

| DRIED PLANT ANALYSIS | | | |
|---|---|---|---|
| | Example I Prior art | Example II Invention | Example III Lovatt patent |
| Total P (%) | 0.69 | 0.82 | 0.69 |
| Total K (%) | 1.90 | 1.91 | 1.79 |

The results of Experiment 1 indicate that the composition of Example II provides an improved rate of absorption of phosphorus into a plant 18.18% better when compared with the prior art or a comparable formula as taught by Lovatt without affecting the potassium uptake.

Experiment 2

Experiment 1 was repeated upon bush bean plants rather than tomato plants. The analysis results are as follows:

| DRIED PLANT ANALYSIS | | | |
|---|---|---|---|
| | Example I Prior art | Example II Invention | Example III Lovatt patent |
| Total P (%) | 0.26 | 0.31 | 0.27 |
| Total K (%) | 1.73 | 1.80 | 1.78 |

The results indicate that the novel composition of Example II provides an improved rate of absorption of phosphorus (19.2% improvement) into a bush bean plant when compared to the prior art or a comparable formula according to Lovatt (4% improvement).

Experiment 3

Samples from Examples VII, VIII, and IX were diluted 250 to 1 with water and then sprayed on tomato plants at 5 mililiters per plant. Four different plants were sprayed with each solution. One week after the application of the solution, the twelve plants were cut at soil level, washed with dilute acid and water and then dried in an oven at 75 degrees C. for 24 hours. The dried plants were then analyzed for nitrogen, phosphorus and potassium. The analysis results are as follows:

DRIED PLANT ANALYSIS

|  | Example VII Prior art | Example VIII Invention | Example IX Lovatt patent |
|---|---|---|---|
| Total N (%) | 3.9 | 3.9 | 3.6 |
| Total P (%) | 0.41 | 0.49 | 0.40 |
| Total K (%) | 2.82 | 2.95 | 2.93 |

As in Experiments 1 and 2, the fertilizer embodying the invention increased the plant's phosphorus intake by about 20% when compared to examples of the prior art.

I claim:

1. An improved concentrated phosphorus fertilizer having a phosphorus containing acid or salts thereof, selected from the group consisting of phosphorous acid, hypophosphorous acid, polyphosphorous acid, polyhypophosphorous acid and salts thereof, wherein the improved fertilizer consists essentially of at least 1% but less than 30% by weight of an inorganic complexing agent or salts thereof selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc phosphate, magnesium polyphosphate and iron polyphosphate; said concentrated phosphorus fertilizer being a stable solution; and when said concentrated phosphorus fertilizer is diluted with water, a substantially fully soluble fertilizer having an acceptable pH for phosphorus uptake is formed.

2. The improved phosphorus fertilizer of claim 1 wherein said fertilizer, when diluted, has a pH of from about 5.0 to about 7.5.

3. A concentrated phosphorus fertilizer formulation comprising:
   a) a phosphorus containing acid or its salts selected from the group consisting of phosphorous acid, hypophosphorous acid, polyphosphorous acid, polyhypophosphorous acid and salts thereof;
   b) an inorganic complexing agent or salts thereof comprising at least 1% but less than 30% by weight of the concentrated phosphorus fertilizer formulation, said inorganic complexing agent or salts thereof being selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc phosphate, magnesium polyphosphate, and iron polyphosphate; and said concentrated phosphorus fertilizer formulation when diluted with water forming a substantially fully soluble fertilizer.

4. The concentrated phosphorus fertilizer of claim 3 wherein said fertilizer, when diluted with water, has a pH of about 5.0 to 7.5.

5. A method of improving the phosphorus uptake of plants comprising application of the water diluted concentrated phosphorus fertilizer of claim 3 to plants.

6. A method of improving the growth rate of plants comprising applications of the water diluted concentrated phosphorus fertilizer of claim 3 to plants.

7. A method of improving the phosphorus uptake of plants comprising:

providing an inorganic acid complexing agent or salts thereof selected from the group consisting of polyphosphoric acid, dipolyphosphoric acid, tripolyphosphoric acid, tetra polyphosphoric acid, penta polyphosphoric acid, hexapolyphosphoric acid, potassium polyphosphate, ammonium polyphosphate, sodium polyphosphate, zinc phosphate, magnesium polyphosphate, and iron polyphosphate;

providing a phosphorus containing acid or its salts selected from the group consisting of phosphorous acid, hypophosphorous acid, polyphosphorous acid, polyhypophosphorous acid and salts thereof;

mixing said inorganic acid complexing agent or salts thereof and said phosphorus containing acid to form a concentrated liquid fertilizer wherein at least 1% but less than 30% by weight of said concentrated liquid fertilizer is the inorganic complexing agent or salts thereof;

diluting said concentrated liquid fertilizer with water to form a substantially fully soluble fertilizer having a foliage-acceptable pH for phosphorus uptake; and applying said diluted fertilizer to said plants.

* * * * *